(12) United States Patent
Klauss et al.

(10) Patent No.: US 7,225,458 B2
(45) Date of Patent: *May 29, 2007

(54) METHOD AND APPARATUS FOR ENSURING RECEPTION OF CONDITIONAL ACCESS INFORMATION IN MULTI-TUNER RECEIVERS

(75) Inventors: Peter M. Klauss, Torrance, CA (US); Raynold M. Kahn, Los Angeles, CA (US); Gregory J. Gagnon, Torrance, CA (US); David D. Ha, San Gabriel, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 386 days.

This patent is subject to a terminal disclaimer.

(21) Appl. No.: 10/302,414

(22) Filed: Nov. 21, 2002

(65) Prior Publication Data
US 2004/0102154 A1  May 27, 2004

(51) Int. Cl.
*H04H 1/00* (2006.01)
*H04H 7/00* (2006.01)

(52) U.S. Cl. .................. 725/63; 455/3.02; 725/25
(58) Field of Classification Search ...... 455/3.01–3.06; 725/25, 27, 31, 68, 100, 131, 28, 71; 348/7.31
See application file for complete search history.

(56) References Cited

U.S. PATENT DOCUMENTS

| 4,613,901 A | 9/1986 | Gilhousen et al. |
|---|---|---|
| 4,633,309 A | 12/1986 | Li et al. |
| 4,675,732 A | 6/1987 | Oleson |
| 4,866,769 A | 9/1989 | Karp |
| 4,866,787 A | 9/1989 | Oleson |
| 5,033,084 A | 7/1991 | Beecher |
| 5,132,992 A | 7/1992 | Yurt et al. |
| 5,168,353 A | 12/1992 | Walker et al. |
| 5,172,413 A | 12/1992 | Bradley et al. |
| 5,199,066 A | 3/1993 | Logan |
| 5,301,352 A | 4/1994 | Nakagawa et al. |
| 5,357,276 A | 10/1994 | Banker et al. |

(Continued)

FOREIGN PATENT DOCUMENTS

EP  0936812  8/1999

(Continued)

OTHER PUBLICATIONS

P. Venkat Rangan et al., "Designing an On-Demand Multimedia Service", IEEE Communications Magazine, Jul. 1992, vol. 30, No. 7, title page and pp. 56-64.

(Continued)

*Primary Examiner*—Simon Nguyen
(74) *Attorney, Agent, or Firm*—Georgann S. Grunebach (57) ABSTRACT

A method and apparatus for receiving conditional access information (CAI) on one or more of a plurality of tuners while the user is selecting different channels is disclosed. The method comprises the steps of receiving the CAI on a first tuner tuned to a first channel; identifying the first tuner as the tuner receiving the CAI; and commanding the second tuner to receive the CAI after receiving a command to retune the first tuner from the first channel to a second channel.

20 Claims, 6 Drawing Sheets

U.S. PATENT DOCUMENTS

| | | |
|---|---|---|
| 5,371,551 A | 12/1994 | Logan et al. |
| 5,386,587 A | 1/1995 | Yuzawa |
| 5,396,293 A | 3/1995 | Shellard |
| 5,420,866 A | 5/1995 | Wasilewski |
| 5,438,423 A | 8/1995 | Lynch et al. |
| 5,440,336 A | 8/1995 | Buhro et al. |
| 5,473,609 A | 12/1995 | Chaney |
| 5,495,531 A | 2/1996 | Smiedt |
| 5,557,541 A | 9/1996 | Schulhof et al. |
| 5,565,805 A | 10/1996 | Nakagawa et al. |
| 5,583,937 A | 12/1996 | Ullrich et al. |
| 5,586,264 A | 12/1996 | Belknap et al. |
| 5,592,551 A | 1/1997 | Lett et al. |
| 5,592,651 A | 1/1997 | Rackman |
| 5,594,491 A | 1/1997 | Hodge et al. |
| 5,619,247 A | 4/1997 | Russo |
| 5,640,453 A | 6/1997 | Schuchman et al. |
| 5,642,418 A | 6/1997 | Farris et al. |
| 5,663,896 A | 9/1997 | Aucsmith |
| 5,675,390 A | 10/1997 | Schindler et al. |
| 5,677,895 A | 10/1997 | Mankovitz |
| 5,701,383 A | 12/1997 | Russo et al. |
| 5,710,970 A | 1/1998 | Walters et al. |
| 5,715,315 A | 2/1998 | Handelman |
| 5,715,403 A | 2/1998 | Stefik |
| 5,721,829 A | 2/1998 | Dunn et al. |
| 5,724,646 A | 3/1998 | Ganek et al. |
| 5,729,280 A | 3/1998 | Inoue et al. |
| 5,748,732 A | 5/1998 | Le Berre et al. |
| 5,761,302 A | 6/1998 | Park |
| 5,764,762 A | 6/1998 | Kazmierczak et al. |
| 5,784,095 A | 7/1998 | Robbins et al. |
| 5,790,663 A | 8/1998 | Lee et al. |
| 5,793,971 A | 8/1998 | Fujita et al. |
| 5,805,699 A | 9/1998 | Akiyama et al. |
| 5,826,165 A | 10/1998 | Echeita et al. |
| 5,831,664 A | 11/1998 | Wharton et al. |
| 5,845,240 A | 12/1998 | Fielder |
| 5,850,218 A | 12/1998 | La Joie et al. |
| 5,864,747 A | 1/1999 | Clark et al. |
| 5,867,207 A | 2/1999 | Chaney et al. |
| 5,899,582 A | 5/1999 | DuLac |
| 5,912,969 A | 6/1999 | Sasamoto et al. |
| 5,914,941 A | 6/1999 | Janky |
| 5,926,205 A | 7/1999 | Krause et al. |
| 5,930,215 A | 7/1999 | Fite et al. |
| 5,933,500 A | 8/1999 | Blatter et al. |
| 5,936,660 A * | 8/1999 | Gurantz ............... 725/71 |
| 5,937,067 A | 8/1999 | Thatcher et al. |
| 5,953,418 A | 9/1999 | Bock et al. |
| 5,966,186 A | 10/1999 | Shigihara et al. |
| 5,973,756 A | 10/1999 | Ertin |
| 5,978,649 A | 11/1999 | Kahn |
| 5,999,628 A | 12/1999 | Chan |
| 5,999,629 A | 12/1999 | Heer et al. |
| 6,005,937 A | 12/1999 | Lee |
| 6,011,511 A | 1/2000 | Chuong et al. |
| 6,025,868 A | 2/2000 | Russo |
| 6,035,038 A | 3/2000 | Campinos et al. |
| 6,055,314 A | 4/2000 | Spies et al. |
| 6,055,566 A | 4/2000 | Kikinis |
| 6,061,451 A | 5/2000 | Muratani et al. |
| 6,061,452 A | 5/2000 | Suzuki |
| 6,069,647 A | 5/2000 | Sullivan et al. |
| 6,072,873 A | 6/2000 | Bewick |
| 6,072,982 A | 6/2000 | Haddad |
| 6,075,330 A | 6/2000 | Terk |
| 6,091,883 A | 7/2000 | Artigalas et al. |
| 6,097,441 A | 8/2000 | Allport |
| 6,144,400 A | 11/2000 | Ebisawa |
| 6,154,206 A * | 11/2000 | Ludtke ............... 713/168 |
| 6,157,719 A | 12/2000 | Wasilewski et al. |
| 6,157,949 A | 12/2000 | Cheng et al. |
| 6,160,988 A | 12/2000 | Shroyer et al. |
| 6,169,879 B1 | 1/2001 | Perlman |
| 6,198,875 B1 | 3/2001 | Edenson et al. |
| 6,202,211 B1 | 3/2001 | Williams, Jr. |
| 6,229,895 B1 | 5/2001 | Son et al. |
| 6,240,401 B1 | 5/2001 | Oren et al. |
| 6,263,504 B1 | 7/2001 | Ebisawa |
| 6,266,481 B1 | 7/2001 | Lee et al. |
| 6,286,142 B1 | 9/2001 | Ehreth |
| 6,288,716 B1 | 9/2001 | Humpleman et al. |
| 6,289,455 B1 | 9/2001 | Kocher et al. |
| 6,317,883 B2 | 11/2001 | Marics |
| 6,317,884 B1 | 11/2001 | Eames et al. |
| 6,370,688 B1 | 4/2002 | Hejna, Jr. |
| 6,398,245 B1 | 6/2002 | Gruse et al. |
| 6,405,372 B1 * | 6/2002 | Kim et al. ............... 725/50 |
| 6,415,031 B1 | 7/2002 | Colligan et al. |
| 6,437,836 B1 | 8/2002 | Huang et al. |
| 6,456,985 B1 | 9/2002 | Ohtsuka |
| 6,466,671 B1 | 10/2002 | Maillard et al. |
| 6,466,921 B1 | 10/2002 | Cordery et al. |
| 6,473,858 B1 | 10/2002 | Shimomura et al. |
| 6,480,667 B1 | 11/2002 | O'Connor |
| 6,487,663 B1 | 11/2002 | Jaisimha et al. |
| 6,487,722 B1 | 11/2002 | Okura et al. |
| 6,496,980 B1 | 12/2002 | Tillman et al. |
| 6,502,139 B1 | 12/2002 | Birk et al. |
| 6,516,465 B1 | 2/2003 | Paskins |
| 6,519,772 B1 | 2/2003 | Bopardikar |
| 6,530,085 B1 | 3/2003 | Perlman |
| 6,542,870 B1 | 4/2003 | Matsumoto |
| 6,550,011 B1 | 4/2003 | Simms, III |
| 6,574,609 B1 | 6/2003 | Downs et al. |
| 6,611,812 B2 | 8/2003 | Hurtado et al. |
| 6,637,027 B1 * | 10/2003 | Breslauer et al. ............. 725/25 |
| 6,654,547 B1 | 11/2003 | Maeda et al. |
| 6,655,580 B1 | 12/2003 | Ergo et al. |
| 6,671,881 B1 | 12/2003 | Tamer et al. |
| 6,741,834 B1 * | 5/2004 | Godwin ............... 455/3.01 |
| 6,745,245 B1 * | 6/2004 | Carpenter ............... 709/229 |
| 6,772,434 B1 * | 8/2004 | Godwin ............... 725/68 |
| 6,853,728 B1 | 2/2005 | Kahn et al. |
| 2001/0001876 A1 | 5/2001 | Morgan et al. |
| 2001/0046299 A1 | 11/2001 | Wasilewski et al. |
| 2002/0001386 A1 | 1/2002 | Akiyama |
| 2002/0010920 A1 | 1/2002 | Bertram |
| 2002/0023219 A1 | 2/2002 | Treffers et al. |
| 2002/0048367 A1 | 4/2002 | Maillard |
| 2002/0056112 A1 | 5/2002 | Dureau et al. |
| 2002/0101991 A1 * | 8/2002 | Bacon et al. ............... 380/212 |
| 2002/0112243 A1 | 8/2002 | Hunter et al. |
| 2002/0116705 A1 * | 8/2002 | Perlman et al. ............... 725/31 |
| 2002/0170054 A1 | 11/2002 | Kudelski et al. |
| 2002/0170072 A1 * | 11/2002 | Lundbald et al. ............ 725/131 |
| 2002/0196374 A1 * | 12/2002 | Barry et al. ............... 348/725 |
| 2002/0196939 A1 | 12/2002 | Unger et al. |
| 2003/0002679 A1 | 1/2003 | Akiyama et al. |
| 2003/0002680 A1 | 1/2003 | Akiyama et al. |
| 2003/0040962 A1 | 2/2003 | Lewis |
| 2003/0061477 A1 | 3/2003 | Kahn |
| 2003/0105718 A1 | 6/2003 | Hurtado et al. |
| 2003/0110132 A1 | 6/2003 | Sako |
| 2003/0145183 A1 | 7/2003 | Muehrina |
| 2003/0174844 A1 | 9/2003 | Candelore |
| 2003/0196113 A1 * | 10/2003 | Brown et al. ............... 713/201 |
| 2003/0208771 A1 | 11/2003 | Hensgen et al. ............ 725/100 |

| | | | |
|---|---|---|---|
| 2003/0228911 | A1 | 12/2003 | Dernis et al. |
| 2004/0003079 | A1 | 1/2004 | Aiu et al. |

FOREIGN PATENT DOCUMENTS

| | | |
|---|---|---|
| EP | 0975165 | 1/2000 |
| EP | 0989557 | 3/2000 |
| EP | 1 156 676 A | 11/2001 |
| EP | 1 304 871 A | 4/2003 |
| EP | 1353511 | 10/2003 |
| EP | 1369152 | 12/2003 |
| GB | 2354392 | 3/2001 |
| JP | 06351023 | 12/1994 |
| JP | 11136708 | 5/1999 |
| WO | WO 92/11713 | 7/1992 |
| WO | WO 00/13412 | 3/2000 |
| WO | WO 00/14967 | 3/2000 |
| WO | WO 00/19294 | 4/2000 |
| WO | WO 01/37546 | 5/2001 |
| WO | WO 01/43444 A | 6/2001 |
| WO | WO 02/15184 | 2/2002 |
| WO | WO02/065750 | 8/2002 |

OTHER PUBLICATIONS

Wanjoun Liao wt al., "The Split and Merge Protocol for Interactive Video-On-Demand", IEEE Multimedia, Oct.-Dec. 1997, vol. 4, No. 4, index and pp. 51-62.

Robert Johnston et al., "A Digital Television Sequence Store", IEEE Transactions on Communication, May 1978, vol. COM-26, No. 5, index and pp. 594-600.

"Proposed SMPTE Standard for Television-Splice Points for MPEG-2 Transport Streams", SMPTE Journal, Oct. 1998, SMPTE 312M, pp. 916-925.

Michael Robin et al., "Digital Television Fundamentals-Design and Installation of Video and Audio Systems", McGraw-Hill, Chapter 8, title page(s) and pp. 345-425.

Yongchen Li et al., "Security Enhanced MPEG Player", IEEE, 1996, pp. 169-175.

Fink, Ready to take the dive? It's fast-forward as new DVD and divx formats hit market (includes graphic: home video: the next generation plus: Some selections that show off the system), . . .

Sin-Joo Lee et al., A Survey of Watermarking Techniques Applied to Multimedia, IEEE, 2001, pp. 272-277.

"PocketTV Brings Video to Palm-size PC", Mar. 9, 2000, 2 pages.

1st Report of EBU/SMPTE Task Force for Harmonized Standards for the Exchange of Television Program Material as Bit Streams, May 6, 1997, Version 1.30, pp. 1-73.

B. Schneier, "Applied Cryptography-Protocols, Algorithms, and Source Code in C", 2nd Edition, pp. 216-222, 357-362.

HP Jornada 430/430SE Palm-size PC: User's Guide, Hewlett Packard, 1999, pp. 7-9.

PocketTV-MPEG movie player for Pocket PCT and WinCE, May 17, 2000, MPEG TV, LLC, retrieved from URL: http://web.archive.org/web/2000006210123803/www.mpegtv.com/wince/pockettv/index.html.

Download PockeTV (beta) for WinCE, Nov. 3, 1999, MPEG TV, LLC, retrieved from HRL: http://web.archive.org/web/19991127093158/www.mpegtv.com/wince/pockettv/index.html.

* cited by examiner

METHOD AND APPARATUS FOR ENSURING RECEPTION OF CONDITIONAL ACCESS INFORMATION IN MULTI-TUNER RECEIVERS

CROSS-REFERENCE TO RELATED APPLICATIONS

This application is related to the following patent application, which is hereby incorporated by reference herein:

U.S. patent application Ser. No. 10/302,416, entitled "METHOD AND APPARATUS FOR MINIMIZING CONDITIONAL ACCESS INFORMATION OVERHEAD WHILE ENSURING CONDITIONAL ACCESS INFORMATION RECEPTION IN MULTI-TUNER RECEIVERS," by Peter M. Klauss, Raynold M. Kahn, Gregory J. Gagnon, and David D. Ha, attorney's docket number PD-200184, filed on same date herewith.

BACKGROUND OF THE INVENTION

1. Field of the Invention

The present invention relates to systems and methods for providing video program material to subscribers, and in particular to a method and system for ensuring reception of conditional access information in multi-tuner receivers.

2. Description of the Related Art

Media programs such as video and audio information can be distributed to households via a variety of methods including terrestrial transmitters, cable, the Internet, and satellites. Each of these media distribution systems implement a large number of channels, and are therefore capable of providing a large number of concurrently broadcast media programs to each household.

While existing systems provide a large number of channels, there is a trend towards even greater numbers of channels and greater bandwidth requirements on existing channels to accommodate, for example, HDTV. With regard to satellite-based media program distribution systems, the increased channels and bandwidth demands can be satisfied by the introduction of additional satellites and/or the use of additional transponders on the satellites.

In order to receive signals from each of the plurality of satellites, ground stations can include multiple antennae (each directed to a satellite of interest) coupled to a single tuner, multiple receiving elements (referred to as low noise block converters, or LNBs) using a single reflector, or multiple antennae and multiple tuners.

At the same time, it is important that the media programs transmitted by the satellites be protected from unauthorized reception and/or reproduction. This is accomplished by encrypting the media programs, and broadcasting data that (along with hardware disposed at the receiver station) is used to decrypt the media programs.

Unfortunately, when consumers go from one channel to another, the channel selection may require the receiver to switch from one tuner to the other (since the second channel is being transmitted by a different satellite than the first channel). In some cases, this switching from one tuner to the other can temporarily interrupt the reception of the information required to decrypt the desired media information. This problem is especially notable when the user is rapidly changing channels, or "channel surfing."

What is needed is a system and method for assuring that the information required to decrypt media programs is readily available, even in circumstances when a channel command requires switching tuners from one to another. The present invention satisfies that need.

SUMMARY OF THE INVENTION

In summary, the present invention describes a system and method for receiving conditional access information (CAI) on one or more of a plurality of tuners while the user is selecting different channels. The method comprises the steps of receiving the CAI on a first tuner tuned to a first channel; identifying the first tuner as the tuner receiving the CAI; and commanding the second tuner to receive the CAI after receiving a command to retune the first tuner from the first channel to a second channel. In one embodiment, the apparatus comprises a receiver for receiving a media program and conditional access information (CAI) for decrypting the media program. The receiver comprises a first tuner tunable to a first channel to receive the CAI; a second tuner tunable to the first channel and the second channel; and a verifier, communicatively coupled to the first tuner and the second tuner, the verifier for decrypting the media program using the conditional access information (CAI), for identifying the first tuner as the tuner receiving the CAI, and for commanding the second tuner to receive the CAI after the receiver is commanded to retune the first tuner from the first channel to a second channel.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Video Distribution System

Figure 1:
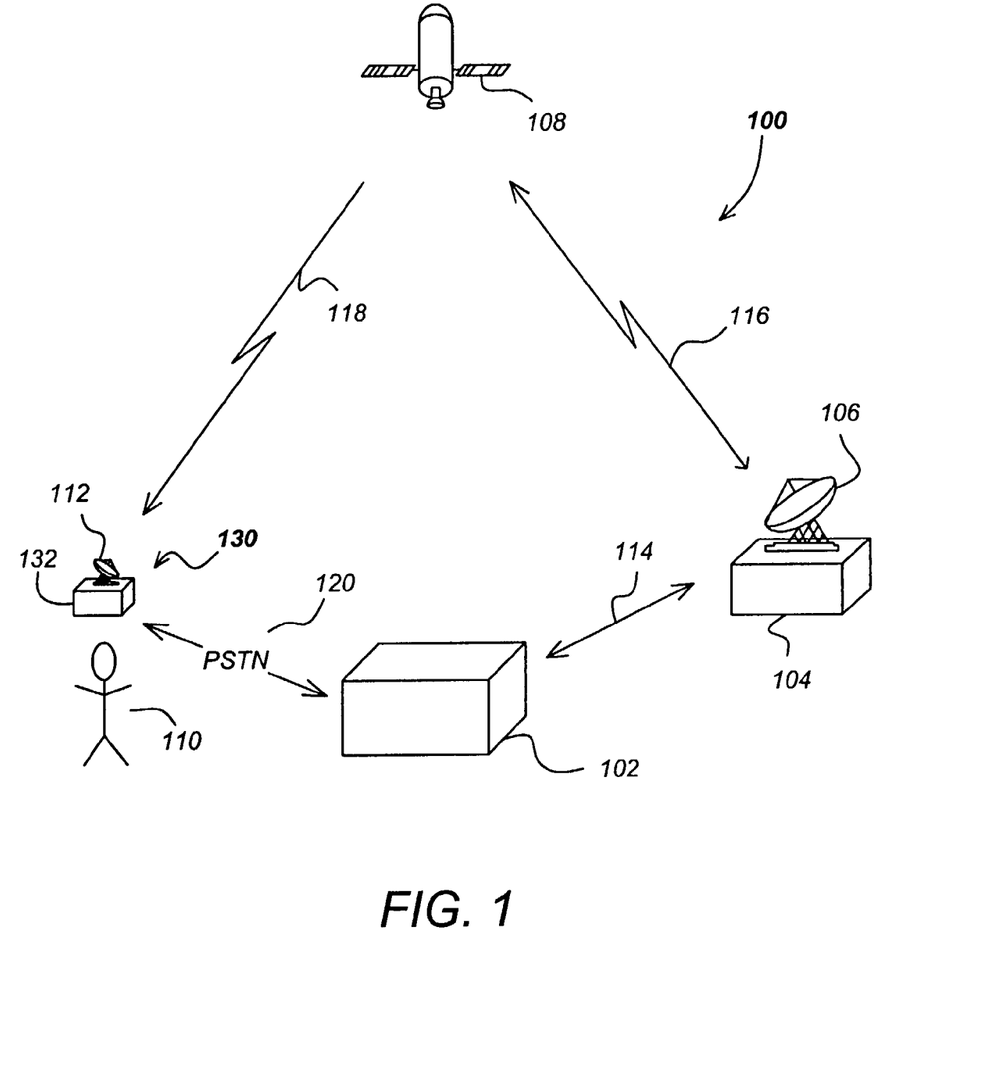
FIG. 1 is a diagram showing an overview of a video distribution system.

FIG. 1 is a diagram illustrating an overview of a video distribution system 100. The video distribution system 100 comprises a control center 102 in communication with an uplink center 104 via a ground link 114 and an integrated receiver/decoder (IRD) 132 at receiver station 130 via a public switched telephone network (PSTN) or other link 120. The control center 102 provides program material to the uplink center 104, coordinates with the receiver station 130 to offer subscribers 110 pay-per-view (PPV) program services, including billing and associated decryption of video programs.

The uplink center 104 receives program material and program control information from the control center 102, and using an uplink antenna 106, transmits the program material and program control information to the satellite 108. The satellite 108 receives and processes this information, and transmits the video programs and control information to the subscriber 110 at the receiver station 130 via downlink 118. The subscriber 110 receives this information using the subscriber antenna 112 communicatively coupled to the IRD 132.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscribers 110. However, using data compression and multiplexing techniques the channel capabilities are far greater. For example, two satellites 108 working together can receive and broadcast over 150 conventional (non-HDTV) audio and video channels via 32 transponders.

While the invention disclosed herein will be described with reference to a satellite based video distribution system 100, the present invention may also be practiced with terrestrial-based transmission of program information, whether by traditional broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber is video (and audio) program material such as a movie, the foregoing method can be used to deliver program material comprising purely audio information or data as well.

Figure 2:
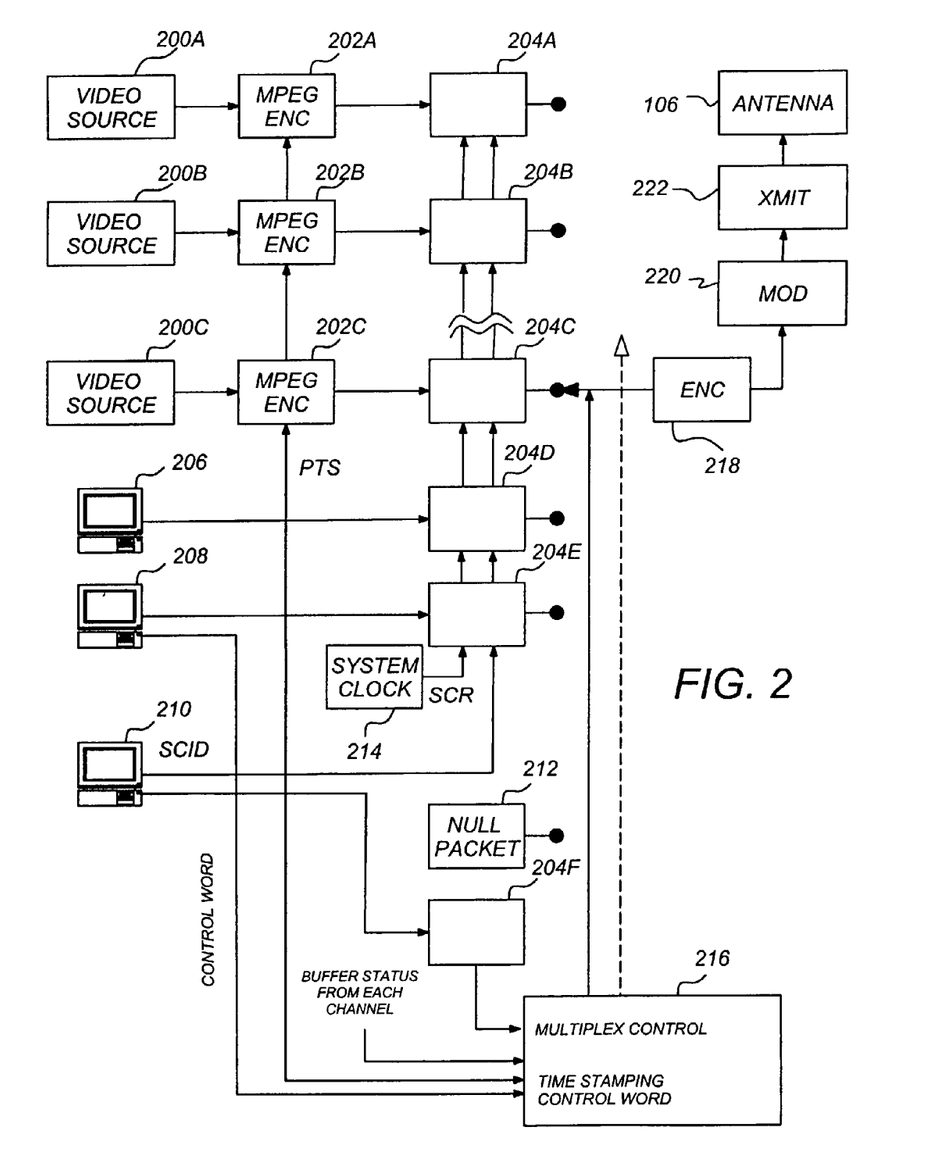
FIG. 2 is a block diagram showing a typical uplink configuration showing how video program material is uplinked to a satellite for transmission to subscribers using a single transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), and a data channel from a computer data source 206.

The video channels are provided by a program source of video material 200A–200C (collectively referred to hereinafter as video source(s) 200). The data from each video program source 200 is provided to an encoder 202A–202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A–204F (collectively referred to hereinafter as packetizer(s) 204) associated with each source 200.

The data packets are assembled using a reference from the system clock 214 (SCR), a control word (CW) generated by the conditional access manager 208, and a system channel identifier (SCID) that associates each of the data packets that are broadcast to the subscriber with a program channel. This information is transmitted to the packetizers 204 for use in generating the data packets. These data packets are then multiplexed into serial data, encoded, modulated, and transmitted. A special packet known as a control word packet (CWP) which comprises control data including the control word (CW) and other control data used in support of providing conditional access to the program material is also encrypted and transmitted.

Figure 3A:
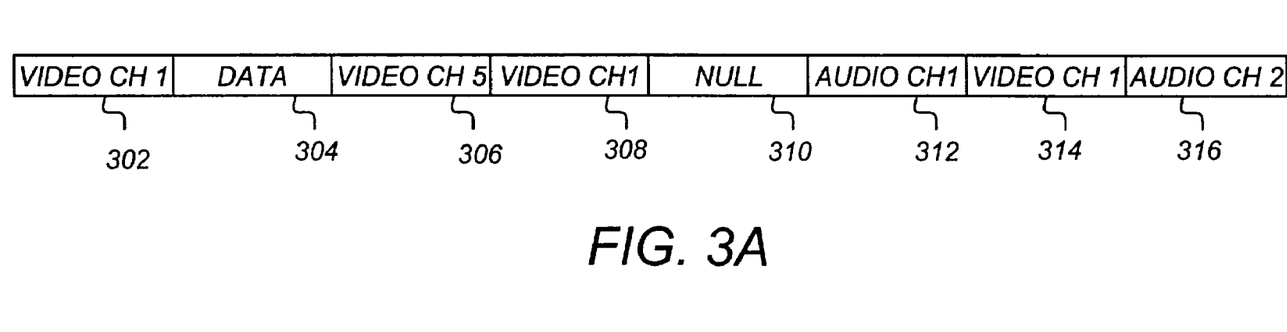
FIG. 3A is a diagram of a representative data stream received from a satellite.

FIG. 3A is a diagram of a representative data stream. The first packet segment 302 comprises information from video channel 1 (data coming from, for example, the first video program source 200A). The next packet segment 304 comprises computer data information that was obtained, for example from the computer data source 206. The next packet segment 306 comprises information from video channel 5 (from one of the video program sources 200), and the next packet segment includes information from video channel 1 (again, coming from the first video program source 200A). The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106.

Subscribers 110 receive media programs via a subscriber receiver or IRD 132. Using the SCID, the IRD 132 reassembles the packets to regenerate the program material for each of the channels. As shown in FIG. 3A, null packets created by the null packet module 312 may be inserted into the data stream as desired.

Figure 3B:
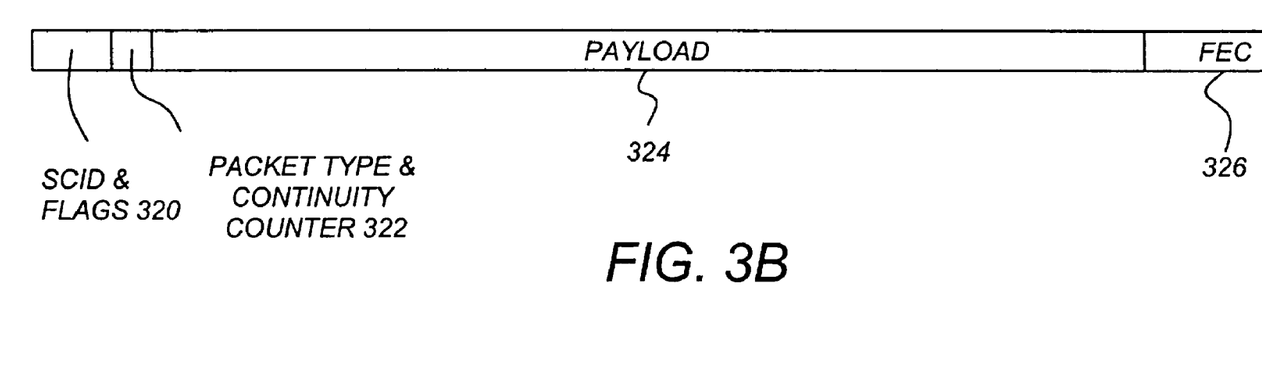
FIG. 3B is a diagram illustrating the structure of a data packet.

FIG. 3B is a diagram of a data packet. Each data packet (e.g. 302–316) is 147 bytes long, and comprises a number of packet segments. The first packet segment 320 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 322 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which is a portion of the video program provided by the video program source 200. The final packet segment 326 is data required to perform forward error correction.

Encryption of Media Programs

Media programs are encrypted by the encryption module 218 before transmission to assure that they are received and viewed only by authorized subscribers. Each media program is encrypted according to an conditional access information (CAI). In one embodiment, the conditional access information includes an alphanumeric encryption key referred to hereinafter as a control word (CW). This encryption can be accomplished by a variety of data encryption techniques, including the data encryption standard (DES) and the Rivest-Shamir-Adleman (RSA) algorithm.

To decrypt the media programs, the subscriber's 110 IRD 132 must also have access to the CW. To maintain security, CWs are not transmitted to the IRD 132 plaintext. Instead, CWs are encrypted before transmission to the subscriber's IRD 132. The encrypted CW is transmitted to the subscriber's IRD 132 in a control word (data) packet.

In one embodiment, the data in the control word packet (CWP) (which is also hereinafter alternatively referred to as a conditional access packet (CAP)), including the CW, is encrypted and decrypted via what is referred to hereinafter as an input/output (I/O) indecipherable algorithm.

An I/O indecipherable algorithm is an algorithm that is applied to an input data stream to produce an output data stream. Although the input data stream uniquely determines the output data stream, the algorithm selected is such that it's characteristics cannot be deciphered from a comparison of even a large number of input and output data streams. The security of this algorithm can be further increased by adding additional functional elements which are non-stationary (that is, they change as a function of time). When such an algorithm is provided with identical input streams, the output stream provided at a given point in time may be different than the output stream provided at another time.

So long as the encryption module 218 and the IRD 132 share the same I/O indecipherable algorithm, the IRD 132 can decode the information in the CWP to retrieve the CW. Then, using the CW, the IRD 132 can decrypt the media program so that it can be presented to the subscriber 110.

To further discourage piracy, the control data needed to decrypt and assemble data packets into viewable media programs may be time-varying (the validity of the control data in a CWP to decode a particular media program changes with time). This can be implemented in a variety of ways.

For example, since each CWP is associated with a SCID for each media program, the SCID related to each CWP could change over time.

Another way to implement time-varying control data is to associate time stamps with the received data stream and the CWP control data. In this case, successful decoding of the CWP to produce the CW would require the proper relationship between the time stamps for the data stream and the control data in the CWP. This relationship can be defined, for example, by changing the decryption scheme used to generate the CW from the CWP according to the received time stamp for the data stream. In this case, if the time stamp of the received data stream does not match the expected value, the wrong decryption scheme will be selected and the proper CW (to decrypt the program material) will not be produced. If, however, the time stamp of the received data stream matches the expected value, the proper decryption scheme will be selected, and the CWP decryption scheme will yield the proper CW.

Subscriber Reception and Decryption of Media Programs

Figure 4:
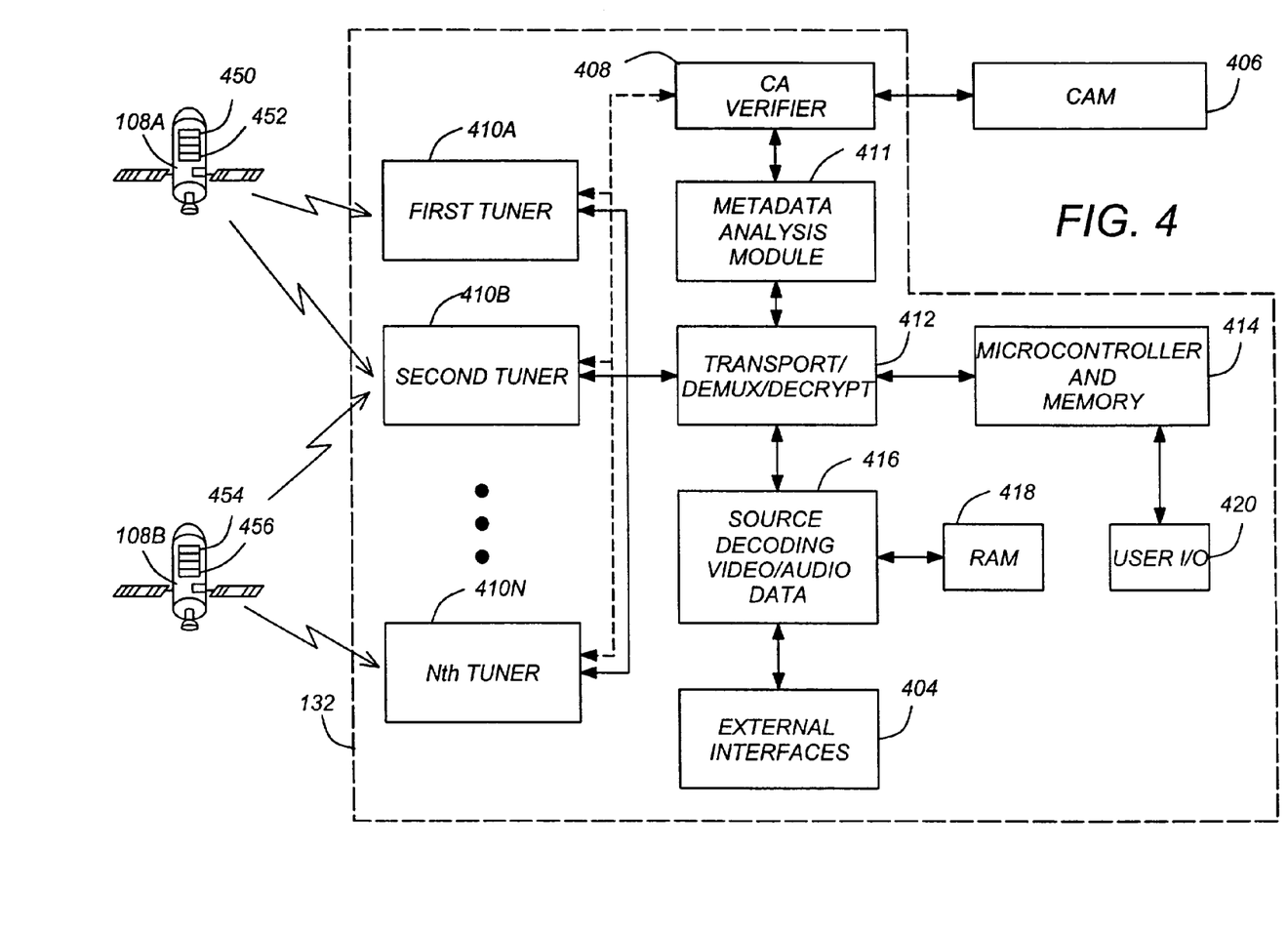
FIG. 4 is a block diagram illustrating a high-level block diagram of the IRD.

FIG. 4 is a simplified block diagram of an IRD 132. The IRD 132 receives and decrypts the media programs broadcast by the video distribution system 100. These media programs are streamed to the IRD 132 in real time, and may include, for example, video, audio, or data services.

The media programs may be transmitted by a plurality of satellites such as satellite 108A and 108B (hereinafter alternatively collectively referred to as satellite(s) 108, each of which typically includes a plurality of transponders 450–456.

The IRD 132 is communicatively coupleable to a conditional access module (CAM) 406. The CAM 406 is typically implemented in a smart card or similar device, which is provided to the subscriber 110 to be inserted into the IRD 132. The CAM 406 interfaces with a conditional access verifier (CAV) 408 which performs at least some of the functions necessary to verify that the subscriber 110 is entitled to access the media programs. The CAV is communicatively coupled to the tuner(s) 410 via other elements in the IRD 132, including the microcontroller and memory 414.

In the illustrated embodiment, the CAV 414 is also communicatively coupled to the tuners 410. This permits the CAV to receive information from the tuners regarding which satellite/transponder/channel each tuner is tuned to and to supply commands to the tuners 410 to switch channels at appropriate times. In another embodiment, the CAV 414 is not directly coupled to the tuners, but receives information regarding the tuners 410 via the microprocessor and memory 414 (which controls the tuners and receives information from them) and provides commands to the tuners via the microprocessor and memory 414 as well.

The CAV 408 may be communicatively coupled to the CAM 406 via a metadata analysis module (MAM) 411. Using the information such as that which can be stored in a metadata table, the MAM 411 acts as a gate-keeper to determine whether stored media programs will be decrypted and presented to the subscriber 110. This is accomplished by comparing the metadata values with measured or accumulated values. The CAV 408 and the MAM 411 can be implemented as separate modules from the transport/demux/decryptor 412 and the microcontroller and memory 414 as shown, or may be implemented via software instructions stored in the memory and performed by the microcontroller 414.

In one embodiment, the IRD 132 comprises a plurality of tuners such as first tuner 410A and second tuner 410B and nth tuner 410N (alternatively referred to hereinafter as tuner(s) 410), a transport and demultiplexing module (TDM) 412, which operates under control of a microcontroller and associated memory 414, a source decoder 416 and communicatively coupled random access memory (RAM) 418, and a user I/O device for accepting subscriber 110 commands and for providing output information to the subscriber.

Each of the tuners 410 receive the data packets from the video distribution system and provides the packets to the TDM 412. The use of multiple tuners 410 allows the IRD 132 to quickly tune a signal from one of a plurality of satellites without moving the antenna or the antenna reflector. The use of two tuners also allows the IRD 132 to receive media program information at a higher bandwidth by receiving information with both tuners simultaneously. This can be implemented by dedicating each tuner to a different low noise block converter (LNB) or an entirely different antenna than the other tuner 410.

Using the SCIDs associated with each media program, the TDM 412 reassembles the data packets according to the channel selected by the subscriber 110, and unencrypts the media programs using the CW key. The TDM 412 can be implemented by a single secure chip, and is communicatively coupled to a microcontroller and memory 414.

Once the media programs are unencrypted, they are provided to the source decoder 416 which decodes the media program data according to MPEG or JPEG standards as appropriate. The decoded media program is then provided to a D/A converter (if necessary) and provided to external interfaces 404 which can include a media program presentation device such as a television, an audio system, or a computer. The source decoder 416 makes use of communicatively coupled RAM 418 to perform these functions.

The CW key is obtained from the CWP using the CAV 408 and the CAM 406. The TDM 412 provides the CWP to the CAM 406 via the CAV 408. The CAM 406 uses the I/O indecipherable algorithm to generate the CW, which is provided back to the TDM 412. The TDM 412 uses the CW to decrypt the media programs. In most IRDs 132, the CAV 408 and the CAM 406 are capable of decrypting one video/audio/data media program at a time.

As described above, to discourage potential pirates, the control data in the CWP used to decode a particular media program may change with time so that it only produces the proper CW when applied to a media program having the proper time stamp. In this case, the CAM 406 can select and/or control the decryption scheme (e.g. the I/O indecipherable algorithm) according to the time stamp associated with the data stream carrying the media program. If the media program is sufficiently disassociated in time, the improper decryption scheme will be used, and the proper CW to decode the media program will not be produced.

Further details regarding the encryption and decryption of media programs can be found in co-pending and commonly assigned U.S. patent application Ser. No. 09/491,959, which application is hereby incorporated by reference herein.

Figure 5A:
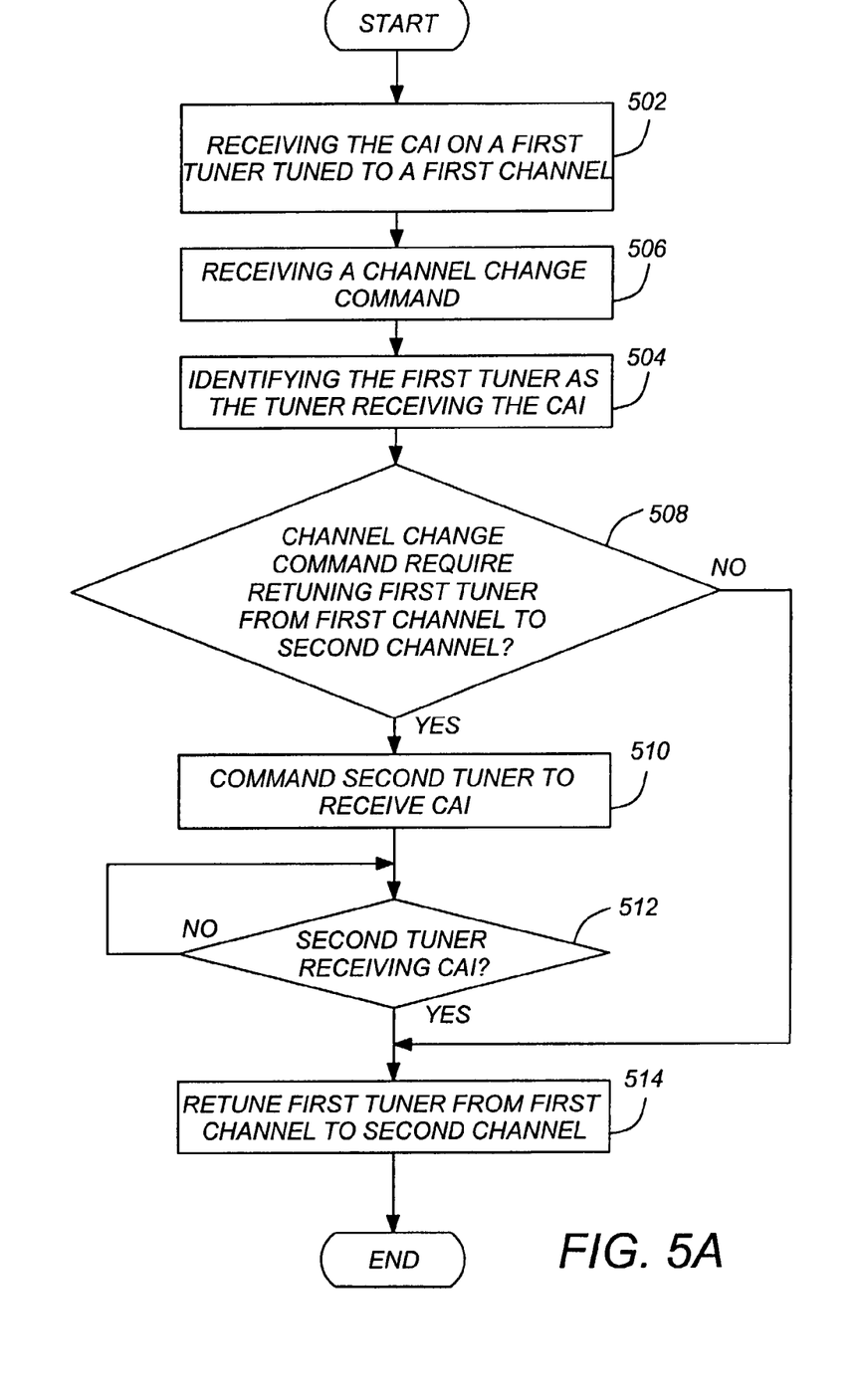
FIGS. 5A–5C are flow charts presenting illustrative process steps that can be used to practice one embodiment of the present invention.

FIG. 5A is a flow chart presenting illustrative process steps that can be used to practice one embodiment of the present invention. Conditional access information (CAI) is received on a first tuner 410A tuned to a first channel, as shown in block 502. This CAI is used, for example, to decrypt the media program currently being viewed the user. A command is received to change the channel being viewed by the user, as shown in block 504. The receiver 132 identifies which of the tuners (e.g. 410A, 410B . . . 410N) is receiving the CAI, as shown in block 506. This can occur after the receipt of the channel change command (as illustrated in FIG. 5A), after the channel change command, or may be determined periodically or on an ongoing basis. A determination is made as to whether the channel change command would require retuning the first tuner (the tuner currently receiving the CAI) away from the current channel (e.g. to another channel), as shown in block 508. If this is the case, there is the possibility that the receipt of the CAI information will be temporarily interrupted, compromising the user's ability to surf rapidly from one channel to another.

A command is provided to a different tuner (e.g. second tuner 410B or 410N) to tune to a channel (and a satellite/transponder combination) to receive the CAI information required to decrypt the media program provided on the selected channel. This is shown in block 510. The first tuner is the retuned from the first channel to the second channel, as was implicated in the channel command. Since the second tuner is now receiving the CAI, the change in channels can be performed without a temporary interruption in the decryption of the media program, as shown in block 514.

In one embodiment, the first tuner is not retuned from the first channel to the second channel until it is confirmed that the second tuner is receiving the CAI. This is shown in block 512. This effectively prevents any channel change to be performed until an appropriate CAI is received.

Figure 5B:
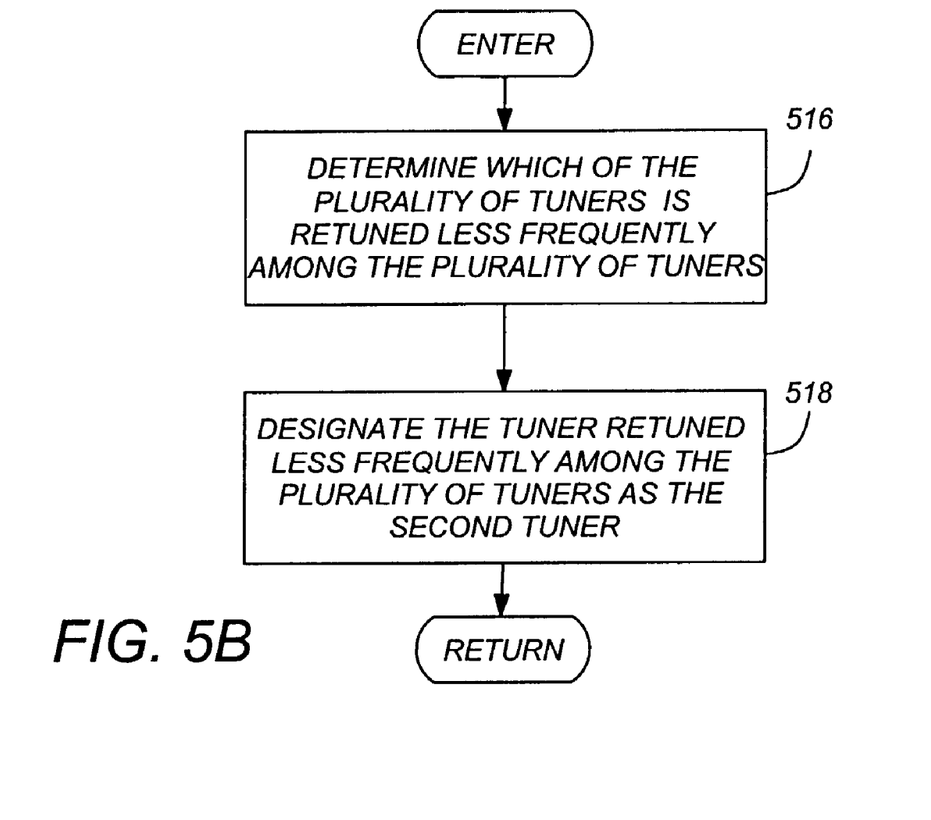

FIG. 5B is flow chart illustrating exemplary process steps that can be used to practice another embodiment of the invention. In this embodiment, the tuning step shown in block 510 includes a determination as to which of the plurality of tuners 410 should be selected to receive the CAI. Of the available tuners, this technique chooses the tuner that is retuned least often, as shown in block 518. Since this tuner is historically retuned less often than the others, using this tuner to receive the CAI should result in fewer service disruptions (e.g. the decision shown in block 508 will result in a "no" more often than if the other tuners were utilized).

Figure 5C:
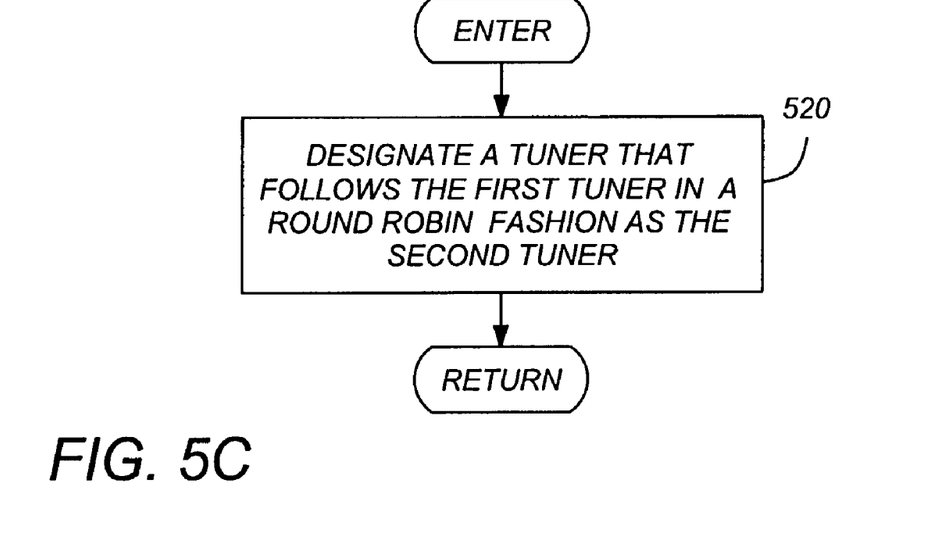

FIG. 5C is a flow chart illustrating another embodiment of the present invention. In this embodiment, in performing the operation of block 510, each of the tuners 410A–410N are selected in order in a round-robin fashion (e.g. 410A, 410B, 410N, 410A, 410B, 410N . . . ). This is shown in block 520. Since this only occurs when block 508 determines that the commanded channel change requires that the tuner receiving the CAI information change from one channel to another, the round robin selection of the next succeeding tuner will assure that the tuners that are more typically tuned to the CAI channels remain so. In other words, if a particular channel is dedicated to receiving the CAI information, the round robin technique will eventually select that channel, and no further retuning will be required. Further in cases where a particular tuner is not dedicated to receive CAI information, but infrequently receives anything else, the round robin technique will eventually select that channel for receiving the CAI information, and the tuner will remain tuned to that channel until such time (which is infrequent) as the tuner is required to tune to another. Therefore, using the round robin technique, the channels which are statistically more likely to not require retuning are tuned to statistically more often.

The foregoing method steps can be implemented in a number of ways, including by use of software modules and hardware modules having a plurality interconnected circuit elements. In one embodiment of the present invention, the steps shown in FIGS. 5A–5C are performed at least in part in the CAV 408, by a hardware module and/or a software module. The processor for performing the operations defined in the software module may be stored in a CAV 408 dedicated memory coupled to a CAV 408 dedicated processor, or may be performed by the microcontroller and associated memory 414. Other elements, such as the CAM 406 and/or the microcontroller and memory 414 may perform some or all of the functions described in FIGS. 5A–5C.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. For example, the encryption functions described herein could be performed by separate encryption/decryption modules, or a single multi-purpose encryption/decryption module can be utilized to perform the encryption/decryption functions of many separate modules.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of receiving conditional access information (CAI) on one or more of a plurality of tuners comprising a first tuner and a second tuner, the CAI usable to decrypt one or more media programs, the method comprising the steps of:

receiving the CAI on a first tuner tuned to a first channel;
identifying the first tuner as the tuner receiving the CAI; and
commanding the second tuner to receive the CAI.

2. The method of claim 1, wherein the step of commanding the second tuner to receive the CAI is performed before retuning the first tuner from the first channel to a second channel.

3. The method of claim 1, further comprising the steps of:
confirming that the second tuner is receiving the CAI; and
commanding the first tuner to retune the first tuner from the first channel to a second channel.

4. The method of claim 3, wherein the step of commanding the second tuner to receive the CAI further comprises the steps of:

determining which of the plurality of tuners is retuned least frequently among the plurality of tuner; and designating the tuner that is retuned least frequently among the plurality of tuners as the second tuner.

5. The method of claim 1, wherein each of the plurality of tuners is identifiable in a round robin sequence and the step of commanding the second tuner to receive the CAI further comprises the steps of:

designating a tuner that follows the first tuner in the round robin sequence as the second tuner.

6. An apparatus for receiving conditional access information (CAI) on one or more of a plurality of tuners comprising a first tuner and a second tuner, the CAI usable to decrypt one or more media programs, the method comprising:

means for receiving the CAI on a first tuner tuned to a first channel;

means for identifying the first tuner as the tuner receiving the CAI; and means for commanding the second tuner to receive the CAI.

7. The apparatus of claim 6, wherein the means for commanding the second tuner to receive the CAI is performed before retuning the first tuner from the first channel to a second channel.

8. The apparatus of claim 6, further comprising:

means for confirming that the second tuner is receiving the CAI; and means for commanding the first tuner to retune the first tuner from the first channel to a second channel.

9. The apparatus of claim 8, wherein the step of commanding the second tuner to receive the CAI further comprises the steps of:

determining which of the plurality of tuners is retuned least frequently among the plurality of tuner; and designating the tuner that is retuned least frequently among the plurality of tuners as the second tuner.

10. The apparatus of claim 6, wherein each of the plurality of tuners is identifiable in a round robin sequence and the step of commanding the second tuner to receive the CAI further comprises the steps of:

designating a tuner that follows the first tuner in the round robin sequence as the second tuner.

11. A receiver for receiving a media program and conditional access information (CAI) for decrypting the media program, comprising:

a first tuner tunable to a first channel to receive the CAI a second tuner tunable to the first channel and a second channel; and a verifier, communicatively coupled to the first tuner and the second tuner, the verifier for decrypting the media program using the conditional access information (CAI), for identifying the first tuner as the tuner receiving the CAI, and for commanding the second tuner to receive the CAI.

12. The receiver of claim 11, wherein the verifier commands the second tuner to receive the CAI before the first tuner is retuned from the first channel to the second channel.

13. The receiver of claim 11, wherein the verifier further comprises a module for confirming that the second tuner is receiving the CAI before the first tuner is retuned from the first channel to the second channel.

14. The receiver of claim 13, wherein the verifier further comprises:

a second module for determining which of the plurality of tuners is retuned least frequently among the plurality of tuner;

a third module for designating the tuner that is retuned least frequently among the plurality of tuners as the second tuner.

15. The receiver of claim 11, wherein each of the plurality of tuners is identifiable in a round robin sequence and the verifier further comprises:

a fourth module for designating a tuner that follows the first tuner in the round robin sequence as the second tuner.

16. A program storage device, readable by a computer, tangibly embodying at least one program of instructions executable by the computer to perform method steps of receiving conditional access information (CAI) on one or more of a plurality of tuners comprising a first tuner and a second tuner, the CAI usable to decrypt one or more media programs, the method steps comprising the steps of:

receiving the CAI on a first tuner tuned to a first channel;

identifying the first tuner as the tuner receiving the CAI; and commanding the second tuner to receive the CAI.

17. The program storage device of claim 16, wherein the method step of commanding the second tuner to receive the CAI is performed before retuning the first tuner from the first channel to a second channel.

18. The program storage device of claim 16, wherein the method steps further comprise the steps of:

confirming that the second tuner is receiving the CAI; and commanding the first tuner to retune the first tuner from the first channel to a second channel.

19. The program storage device of claim 18, wherein the method step of commanding the second tuner to receive the CAI further comprises the method steps of:

determining which of the plurality of tuners is retuned least frequently among the plurality of tuner; and designating the tuner that is retuned least frequently among the plurality of tuners as the second tuner.

20. The program storage device of claim 16, wherein each of the plurality of tuners is identifiable in a round robin sequence and the method step of commanding the second tuner to receive the CAI further comprises the method steps of:

designating a tuner that follows the first tuner in the round robin sequence as the second tuner.

* * * * *